United States Patent
Morita et al.

(10) Patent No.: US 6,830,788 B2
(45) Date of Patent: Dec. 14, 2004

(54) POLYMERIZABLE COMPOUNDS AND OPTICAL COMPENSATORS

(75) Inventors: Kensuke Morita, Minami-ashigara (JP); Hiroshi Takeuchi, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/369,528

(22) Filed: Feb. 21, 2003

(65) Prior Publication Data

US 2003/0224175 A1 Dec. 4, 2003

(30) Foreign Application Priority Data

Feb. 22, 2002 (JP) ........................................ 2002-046455
Aug. 15, 2002 (JP) ........................................ 2002-236864

(51) Int. Cl.[7] .................... C09K 19/00; C02F 1/133; C07C 59/76; C07C 25/00
(52) U.S. Cl. .................... 428/1.1; 428/1.3; 428/413; 428/523; 252/299.01; 349/117; 560/76; 560/83; 570/129
(58) Field of Search .................... 428/1.1, 1.2, 1.3, 428/413, 523; 252/299.01, 299.7; 349/117; 560/76, 83; 570/129

(56) References Cited

U.S. PATENT DOCUMENTS

| 6,338,902 B1 | 1/2002 | Hsu et al. |
| 2003/0072893 A1 * | 4/2003 | Nakano et al. ............... 428/1.1 |

FOREIGN PATENT DOCUMENTS

| JP | 07-110469 A | 4/1995 |
| JP | 08-184858 A | 7/1996 |
| JP | 11-080081 A | 3/1999 |

OTHER PUBLICATIONS

Hikmet et al, "Anisotropic–network–stabilized ferroelectric gels for active matrix addressing"; 1996 American Institute of Physics, *J. Appl. Phys.* 79 (10), pp. 8098–8105, May 15, 1996.

Lub et al, "The synthesis of liquid–crystalline diacrylates derived from cyclohexane units", *Recl. Trav. Chim. Pays–Bas*, 115/06, pp. 321–328, 1996.

Hsu et al, "Preparation of Anisotropic Films for Liquid Crystal Display Application", *Part of the SPIE Conference on Display Technologies II*, Taipei, Taiwan, vol. 3421, pp. 46–52, Jul. 1998.

Hsu et al, "Synthesis of Anisotropic Polymer Films for Display Applications", *Polymer Preprints*, 38(1), pp. 370–371, 1997.

* cited by examiner

*Primary Examiner*—Randy Gulakowski
*Assistant Examiner*—Michael J. Feely
(74) *Attorney, Agent, or Firm*—Burns, Doane, Swecker & Mathis, L.L.P.

(57) ABSTRACT

A novel polymerizable compound represented by Formula (I) is disclosed. In the formula, $A^1$ to $A^4$ respectively denotes a hydrogen or substituent and at least one of $A^1$ to $A^4$ is halogen, alkyl group, alkoxy group, formyl or cyano; $B^1$ and $B^2$ respectively denotes a substituent and at least one of them is a substituent containing acryloyloxy, methacryloyloxy or epoxy. An optical compensator comprising a layer formed from a compound represented by Formula (I) is also disclosed.

Formula (I)

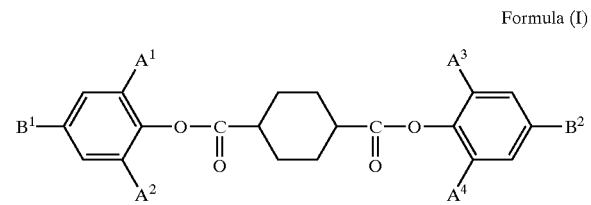

23 Claims, No Drawings

POLYMERIZABLE COMPOUNDS AND OPTICAL COMPENSATORS

TECHNICAL FIELD

The present invention relates to novel polymerizable compounds which are useful for liquid crystal cells, retardation films and the like. And the present invention also relates to optical compensators comprising polymerized the compounds.

RELATED ART

Liquid crystal compounds should meet some conditions such as having proper melting points and wide temperature ranges of liquid crystal phase for usage of liquid crystal displaying cells, optical compensators and so forth. Various compounds have been synthesized depending on such usage.

Some optical films produced by polymerization of liquid crystal compounds having a polymerizable group are disclosed in JP-A No.07-110469 (the term "JP-a" as used herein means an "unexamined published Japanese patent application), JP-A No. 11-80081, "J. Appl. Phys. Vol. 79(1996), No. 10, 80988105" and so forth. According to them, the optical films can be produced by a method comprising a step of melting a compound having a polymerizabble group on a substrate, a step of orienting the compound, and a step of polymerizing the oriented compound. However, since the compounds disclosed in them have so high melting points, it is often the case that the substrates (such as polymer film) having the compounds thereon would distort because of heat. Thus, it is difficult to produce the films through the orienting and polymerizing process.

The compounds, having a small wavelength dependence of refractive indices, disclosed in them also have strong tendencies to form smectic phases, in which the compounds are hard to be optically uniformly oriented, rather than to form a nematic phase, in which the compounds are easy to be optically uniformly oriented, due to a narrow temperature range of the nematic phase. Thus, it is difficult to produce the films having enough optical uniformity as optical compensator films. Providing polmerizable liquid compounds, which have a low melting point and a wide temperature range of a nematic phase, may benefit the technical field of producing optical compensators, like as the material of substrates are free from limitations.

SUMMARY OF THE INVENTION

The present invention, devised in light of the various above-described problems, has for its object to provide a polymerizable compound having a low melting point and a wide temperature range of nematic liquid phase. Another object of the present invention is to provide an optical compensator having uniform optical property such as uniform retardation.

In one aspect, the invention provides a compound represented by Formula (I):

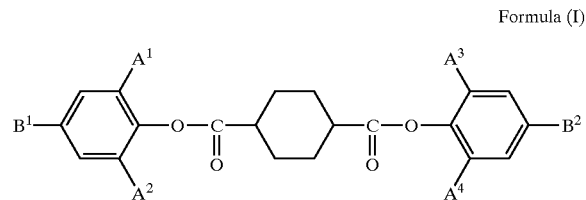

Formula (I)

where $A^1$ to $A^4$ are respectively hydrogen or substituents and one of $A^1$ to $A^4$ is halogen, alkyl group, alkoxy group, formyl or cyano a substituent; $B^1$ and $B^2$ are respectively substituents and at least one of them is a substituent containing acryloyloxy, methacryloyloxy or epoxy.

As preferred embodiment, there are provided the compound wherein both of $B^1$ and $B^2$ contain acrylate or methacrylate; the compound wherein at least one of $A^1$ to $A^4$ is fluorine, chlorine, or methyl; the compound wherein at least one of $A^1$ to $A^4$ is chlorine; the compound wherein both of $A^1$ and $A^3$ are hydrogen and both of $A^2$ and $A^4$ are substituents; the compound wherein the compound exhibits liquid crystallinity.

In one aspect, the present invention provides an optical compensator comprising a layer formed from a compound represented by Formula (I):

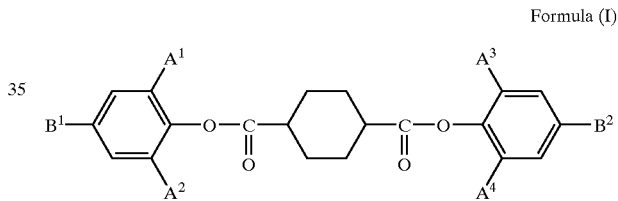

Formula (I)

where $A^1$ to $A^4$ are respectively hydrogen or substituents and at least one of $A^1$ to $A^4$ is halogen, alkyl group, alkoxy group, formyl or cyano; $B^1$ and $B^2$ are respectively substituents and at least one of them is a substituent containing acryloyloxy, methacryloyloxy or epoxy.

DETAILED DESCRIPTION OF THE INVENTION

The present invention is described in detail below.

The polymerizable compound according to the present invention is represented by Formula (I).

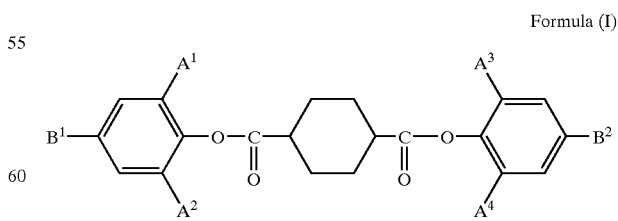

Formula (I)

In the formula (I), $A^1$ to $A^4$ are respectively hydrogen or substituents and at least one of $A^1$ to $A^4$ is halogen, alkyl group, alkoxy group, formyl or cyano. In order to lower a melting point of the compound represented by the formula (I) and prevent transferring to a smectic phase, at least one of $A^1$ to $A^4$ must be a substituent. The substituents denoted by $A^1$ to $A^4$ respectively, are exemplified by halogen atom, alkyl group (including cycloalkyl group having one or more rings such as mono-cycloalkyl and bi-cycloalkyl group), alkenyl group (including cycloalkenyl group having one or more rings, such as mono-cycloalkenyl and bi-cycloalkenyl group), alkynyl group, aryl group, heterocyclic group, cyano, hydroxyl, nitro, carboxyl, alkoxy group, aryloxy group, silyloxy group, heterocyclic oxy group, acyloxy group, carbamoyloxy group, alkoxycarbonyloxy group, aryloxycarbonyloxy group, amino group (including anilino group), acylamino group, aminocarbonylamino group, alkoxycarbonylamino group, aryloxycarbonylamino group, sulfamoylamino group, alkyl- and arylsulfonylamino group, mercapto group, alkylthio group, arylthio group, heterocyclic thio group, sulfamoyl group, sulfo group, alkyl- and arylsulfinyl group, alkyl- and arylsulfonyl group, acyl group, aryloxycarbonyl group, alkoxycarbonyl group, carbamoyl group, aryl- and heterocyclic azo group, imide group, phosphino group, phosphinyl group, phosphinyloxy group, phosphinylamino group, and silyl group.

Furthermore, for the compound having a wide temperature range of a liquid phase, at least one of $A^1$ to $A^4$ should be a small size substituent. Preferred examples of such small size substituents include halogen atom, alkyl groups, alkoxy groups, formyl and cyano; more preferred examples include fluorine, chlorine, methyl, ethyl and methoxy; further more preferred examples include fluorine, chlorine and methyl; most preferred example is chlorine.

One preferred embodiment is the formula in which at least one of benzene rings contained has a substituent (in other words, one of $A^1$ and $A^2$ is hydrogen and the other is a substituent, and/or one of $A^3$ or $A^4$ is hydrogen and the other is a substituent). One more preferred embodiment is the formula in which both the benzene rings contained have a substituent (in other words, one of $A^1$ and $A^2$ is hydrogen and the other is a substituent, and one of $A^3$ or $A^4$ is hydrogen and the other is a substituent). One further more preferred embodiment is the formula in which at least one of benzene rings has a small size substituent (in other words, one of $A^1$ and $A^2$ is hydrogen and the other is a small size substituent, and/or one of $A^3$ or $A^4$ is hydrogen and the other is a small size substituent). One specific preferred embodiment is the formula in which both the benzene rings have a small size substituent (in other words, one of $A^1$ and $A^2$ is hydrogen and the other is a small size substituent, and one of $A^3$ or $A^4$ is hydrogen and the other is a small size substituent).

$B^1$ and $B^2$ are respectively substituents and at least one of them is a substituent containing an acryloyloxy, methacryloyloxy or epoxy. For the compound having a wide temperature range of a liquid phase, $B^1$ and $B^2$ are respectively alkyl groups, alkoxy groups acyloxy groups or alkoxycarbonyl groups. The number of carbon atoms contained in the substituents denoted by $B^1$ and $B^2$ respectively is preferably 1 to 20, and more preferably 3 to 15. The substituents have another substituent such as examples of $A^1$ to $A^4$.

At least one of $B^1$ and $B^2$ contains an acryloyloxy, methacryloyloxy or epoxy used for a fixation of the oriented compound by a polymerization. At least one of $B^1$ and $B^2$ contains preferably an acryloyloxy or methacryloyloxy, and more preferably an acryloyloxy.

Preferred examples of $B^1$ and $B^2$ are the groups represented by formulae (II) to (VIII).

| | |
|---|---|
| —CH$_2$CH$_2$OCOCX=CH$_2$ | Formula (II) |
| —O(CH$_2$)$_n$OCOCX=CH$_2$ | Formula (III) |
| —COO(CH$_2$)$_n$OCOCX=CH$_2$ | Formula (IV) |
| —OCO(CH$_2$)$_n$OCOCX=CH$_2$ | Formula (V) |
| —OCOO(CH$_2$)$_n$OCOCX=CH$_2$ | Formula (VI) |
| —CH$_2$CH$_2$OCO(CH$_2$)$_n$OCOCX=CH$_2$ | Formula (VII) |
| —CH$_2$CH$_2$OCOO(CH$_2$)$_n$OCOCX=CH$_2$ | Formula (VIII) |

In the formulae, X is a hydrogen or methyl and n is an integer of 1 to 10.

The cyclohexane ring contained in the formula (I) have two aryloxycarbonyl groups that may be situated in cis or trans configuration. It is also allowable that the compound is a mixture of cis and trans isomers. The two aryloxycarbonyl groups are preferably situated in trans configuration.

The compound represented by the formula (I) exhibits preferably liquid crystallinity.

The following paragraphs will describe specific examples of the compound represented by the formula (I). It is to be noted, however, that the present invention is by no means limited by such examples.

(I-1)

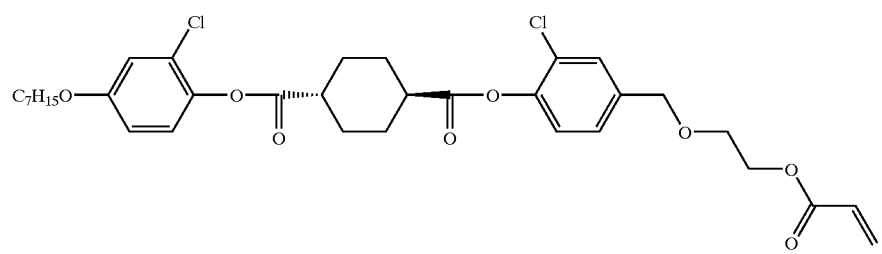

-continued
(I-2)
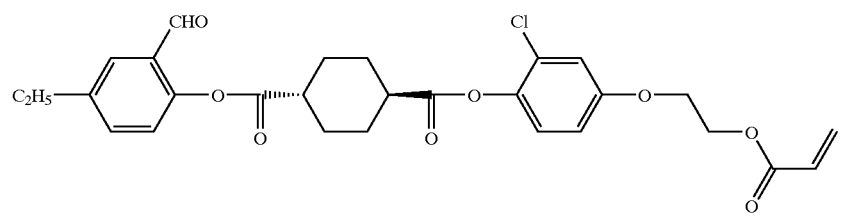
(I-3)
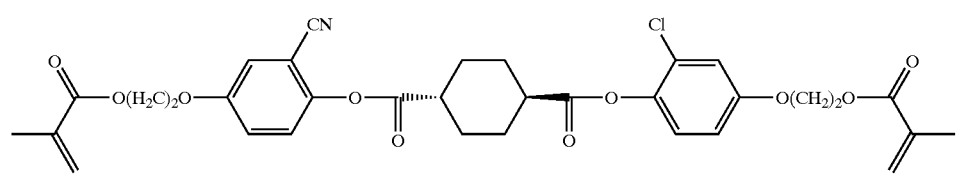
(I-4)
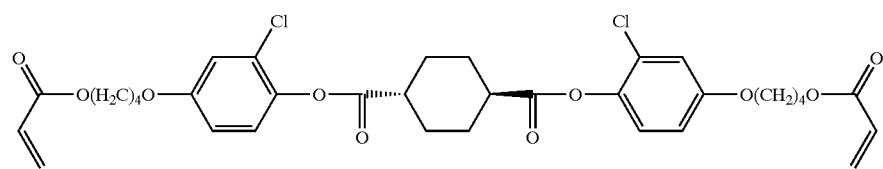
(I-5)
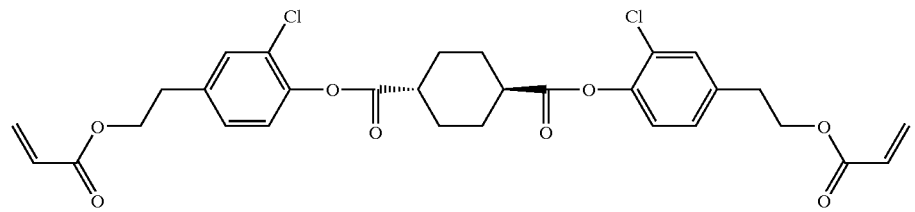
(I-6)
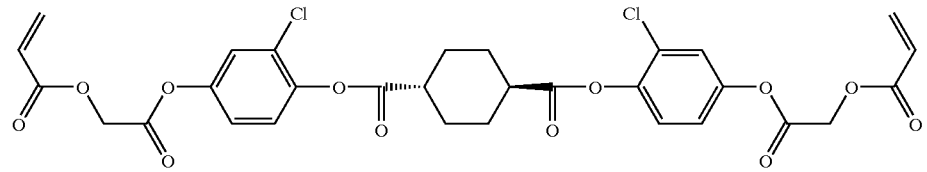
(I-7)
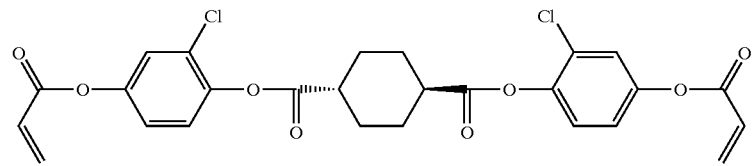
(I-8)
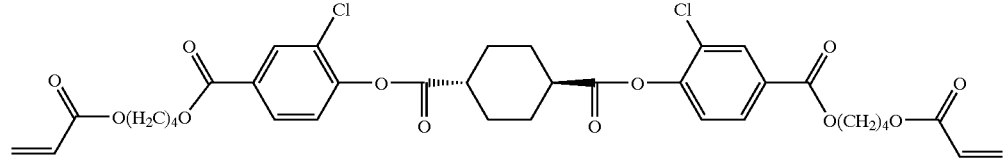
(I-9)
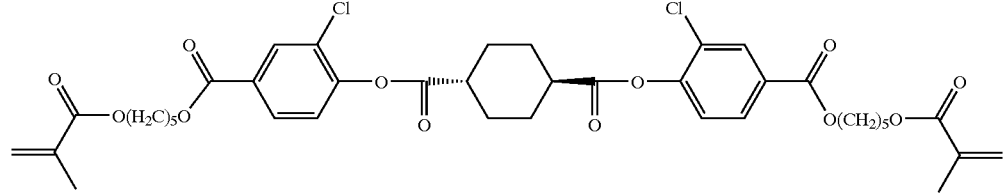

-continued
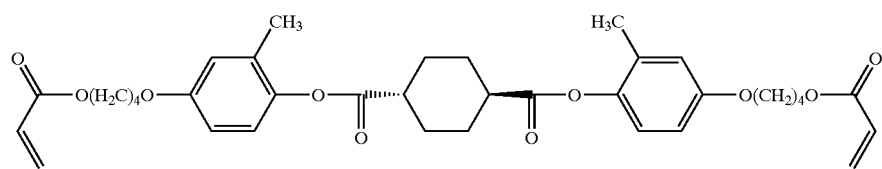
(I-10)
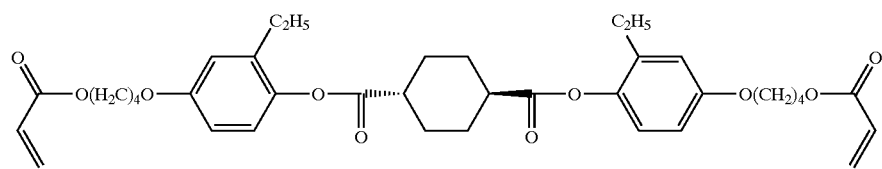
(I-11)
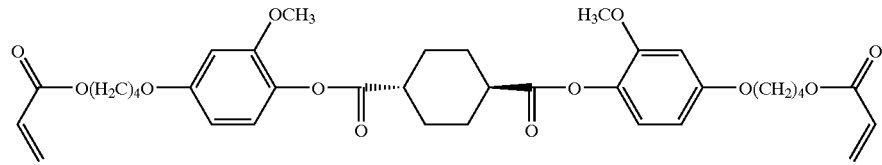
(I-12)
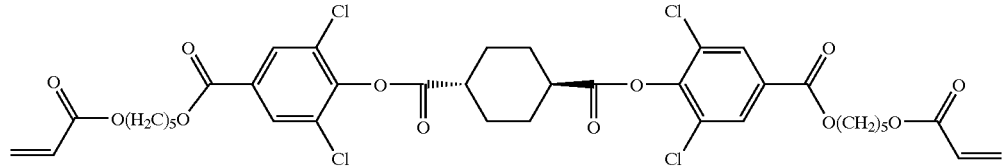
(I-13)
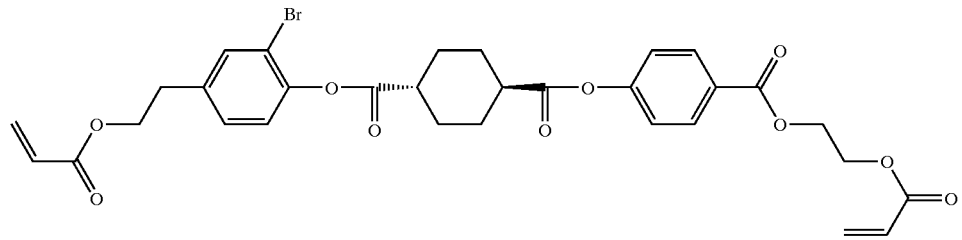
(I-14)
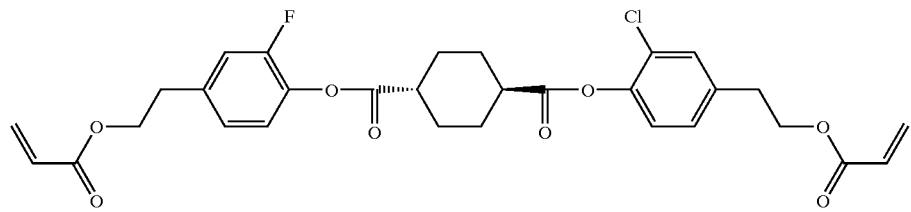
(I-15)
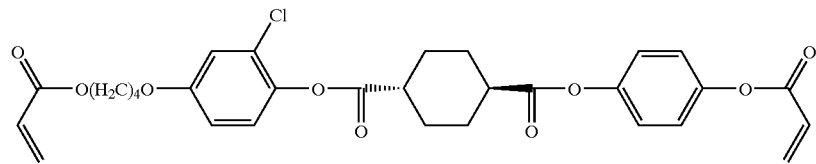
(I-16)
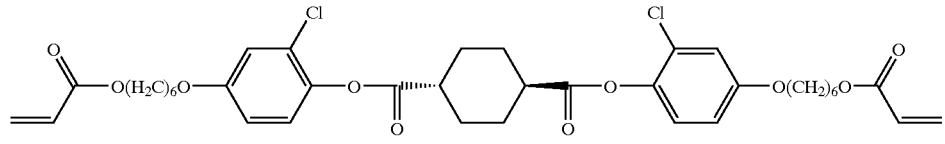
(I-17)
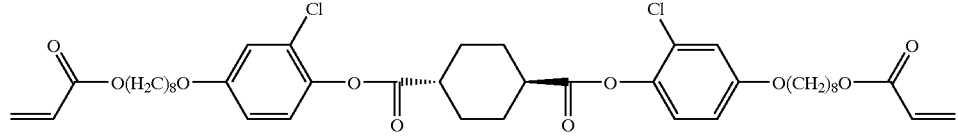
(I-18)

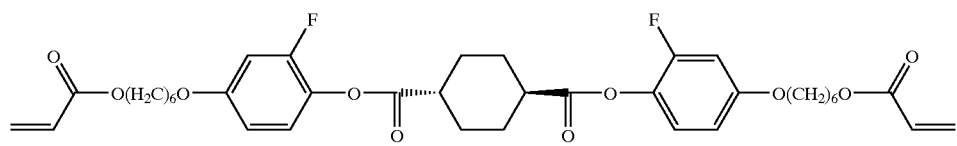
(I-19)
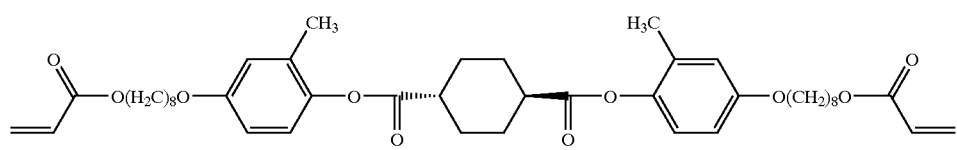
(I-20)
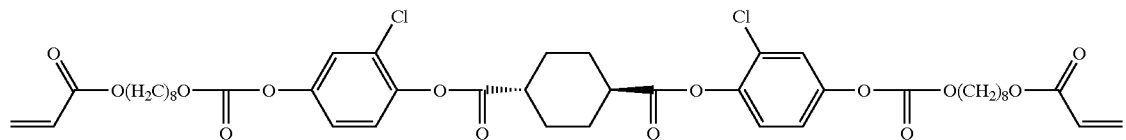
(I-21)
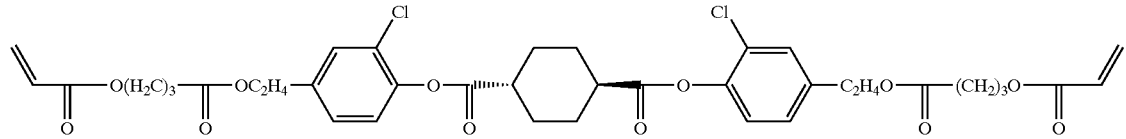
(I-22)
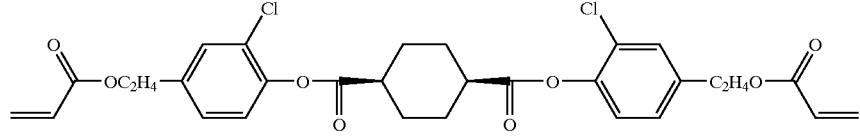
(I-23)
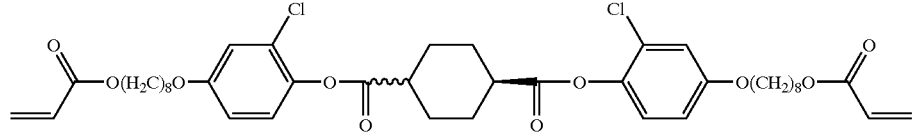
(I-24)
(cis:trans = 1:4 mixture)

The compounds of the present invention can be readily synthesized by reaction of the compound represented by any one of the following formulae (IX) to (XI), which can be synthesized by a known method or obtained commercially, with trans-1,4-cyclohexyane-di-chlorocalbonyl, and if necessary further modification of the obtained product. Reaction condition such as reaction time and temperature may be determined according to known methods, such as disclosed in JP-A-7-110469 and JP-A-11-80081, however, the reaction conditions are not specifically limited.

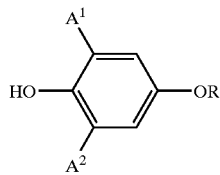

Formula (IX)

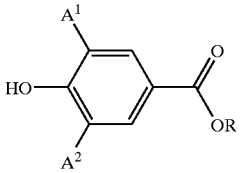

Formula (X)

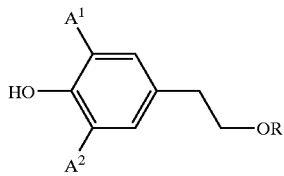

Formula (XI)

In the formulae, $A^1$ and $A^2$ are same as those in the formula (I) and preferred examples of them are same as those in the formula (I). R is a hydrogen or substituent.

The optical compensator according to the present invention comprises a polymer containing a repeated unit based on the compound represented by the formula (I). The optical compensator can be prepared by a method comprising a step of melting a composition, which comprises the compound represented by the formula (I) and if necessary various additives such as a polymerization initiator, on a substrate, a step of orienting the melted compound and a step of fixing the oriented compound by polymerization.

The shape of the optical compensator may be in the form of sheet, film, layer and the like. The optical compensator is preferably used as an optically compensatory sheet comprising a transparent substrate (support) and an optically anisotropic layer wherein the optically anisotropic layer is formed from a compound represented by Formula (I).

In the optical compensator of the present invention, a content of the compound represented by the formula (I) is a major component in the layer (used as an anisotropic layer), preferably 50% or more by weight based on the total weight of the anisotropic layer, more preferably 70% or more, further preferably 90% or more. In addition to the compound represented by the formula (I), the anisotropic layer can contain other additive components such as a polymerization initiator.

The optical compensator of the present invention may be applied to various display modes such as TN (Twisted Nematic), IPS (In-Plane Switching), FLC (Ferroelectric Liquid Crystal), OCB (Optically Compensatory Bend), STN (Supper Twisted Nematic), VA (Vertically Aligned), ECB (Electrically Controlled Birefringence) and HAN (Hybrid Aligned Nematic).

An optically anisotropic element produced by using the compound of the present invention can be used as a polarization conversion prism (disclosed in European Patent No. 428213). The optically anisotropic element can be used as a cholesteric polarizer (disclosed in European Patent No. 606940).

EXAMPLES

The present invention will further be detailed referring to specific Examples. It is to be noted that any materials, reagents, ratios of use thereof and operations shown in the Examples below can properly be modified without departing from the spirit of the present invention. Thus the present invention is by no means limited to the Examples described below.

Example 1

Synthesis of Example Compound (I-5)

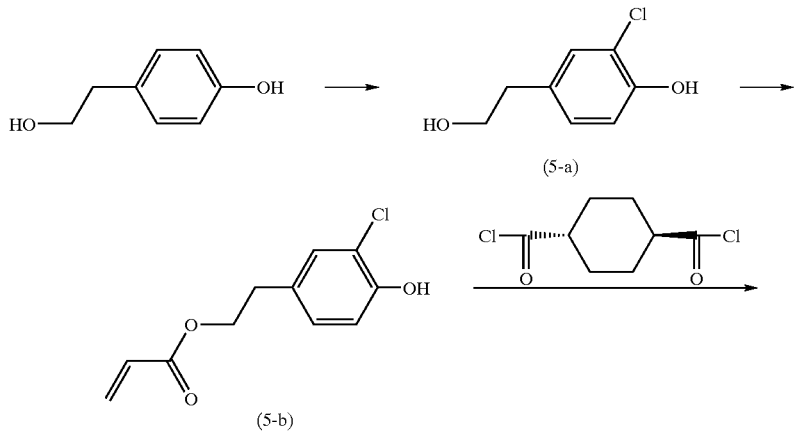

-continued

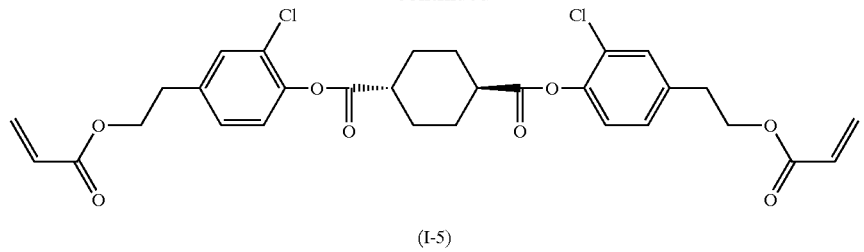

(I-5)

10 g (72.4 mmol) of p-hydroxy-phenyl-ethanol was suspended in 50 ml of chloroform. After 5.81 ml (72.4 mmol) of sulfuric chloride was added dropwise to the suspension, the mixture was stirred for one hour, concentrated in vacuo, and purified by silica gel chromatography. Compound (5-a) was obtained in 9.7 g (56.2 mmol).

Next, 5.0 g (29.0 mmol) of Compound (5-a) was dissolved in 20 ml of ethyl acetate and 4.41 ml (34.8 mmol) of dimethyl aniline was added dropwise to the obtained solution. After added 2.83 ml (34.8 mmol) of acryloyl chloride and stirred for one hour, the mixture was washed with hydrochloric acid solution, dehydrated with magnesium sulfate anhydride and concentrated in vacuo. The obtained crude product was purified by silica gel chromatography to yield 5 g (22.1 mmol) of Compound (5-b).

3.53 g (20.5 mmol) of trans-1,4-cyclohexane-di-carbonic acid was suspended in 15 ml of toluene, 0.2 ml of dimethyl formamide was added to the obtained suspension, the mixture was heated to 60° C. After added 3.15 ml (43.2 mmol) of thionyl chloride and heated at 60° C. for 3 hours, continuously heated at 110° C. for 10 minutes, the mixture was cooled and the toluene solution of trans-1,4-cyclohexane-di-chlorocalbonyl was obtained.

2.7 g (11.9 mmol) of Compound (5-b) was dissolved in 10 ml of chloroform, 571 mg (14.3 mmol) of sodium hydride dispersed in oil in 60% ratio was added to the obtained solution and the mixture was stirred for 15 minutes. 4 ml of the above toluene solution was added dropwise to the mixture under stirring, and after one hour stirring, the mixture was washed with hydrochloric acid solution, was dehydrated with magnesium sulfate anhydride and was concentrated in vacuo. The obtained crude product was purified by silica gel chromatography to yield 2.15 g (3.7 mmol) of Compound (I-5).

The obtained Compound (I-5) exhibited liquid crystallinity and phase transition as follows.

It is to be noted that "C" is crystal phase, "I" is isotropic phase and "N" is namatic phase hereinafter.

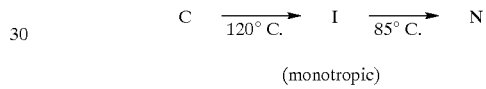

(monotropic)

The NMR data of the compound obtained was as follows:

NMR (CDCl3): δ=7.31 (s, 2H), 7.15 (d, 2H), 7.05 (d, 2H), 6.45 (d, 2H), 6.10 (dd, 2H), 5.82 (d, 2H), 4.38 (t, 4H), 2.98 (t, 4H), 2.70 (m, 2H), 2.35 (m, 4H), 1.73 (m, 4H).

Example 2

Synthesis of Example Compound (I-6)

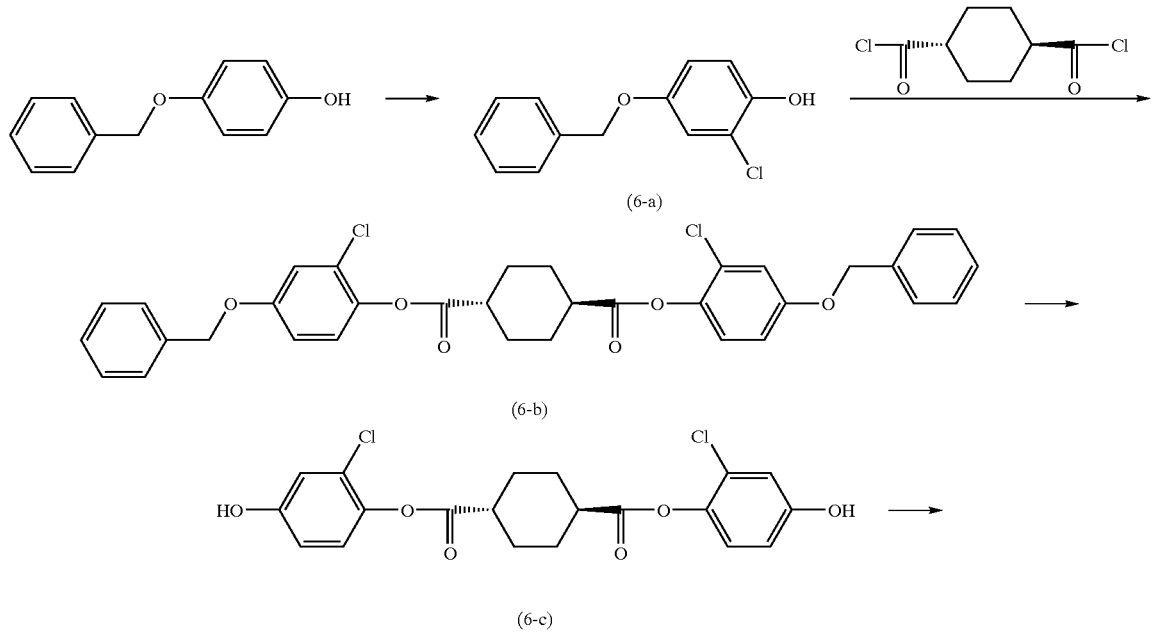

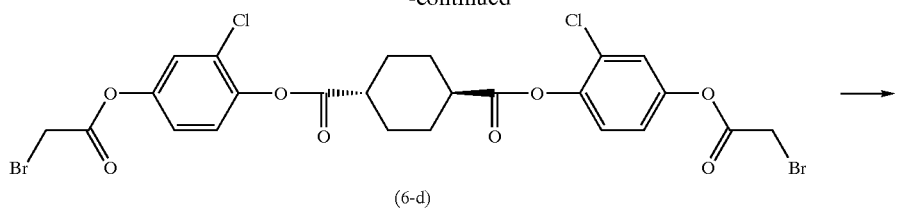

(6-d)

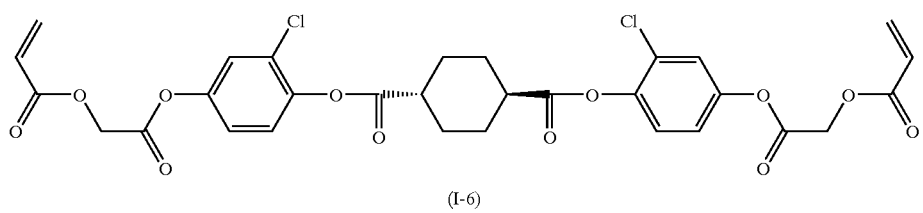

(I-6)

5 g (25.0 mmol) of 4-(benzoyloxy)-phenol was added to 50 ml of chloroform and was dissolved at 60° C. 2.01 ml (25.0 mmol) of sulfuric chloride was added to the solution and the mixture was stirred at 60° C. for 5 minutes and at room temperature for one hour. After being concentrated, the mixture was dissolved in ethyl acetate and hexane was added to the solution to yield 4.2 g (17.9 mmol) of Compound (6-a) in a crystallized condition.

4.0 g (17.0 mmol) of Compound (6-a) was dissolved in 20 ml of chloroform and the solution was added to 2.75 ml (34.08 mmol) of pyridine. The toluene solution of 8.5 mmol of trans-1,4-cyclohexane-di-chlorocarbonyl, which was synthesized by the method same as Example 1, was added dropwise to the chloroform solution, the mixture was washed with hydrochloric acid solution, was dehydrated with magnesium sulfate anhydride and was concentrated in vacuo. The crude product was purified by silica gel chromatography to yield 4.15 g (6.9 mmol) of Compound (6-b).

4 g (6.6 mmol) of Compound (6-b) was dissolved in 40 ml of chloroform and the solution was heated at 40° C. 4 g (20.0 mmol) of iodo trimethyl silane was added to the solution and the mixture was stirred at 40° C. for 2 hours. After the solution was cooled, hexane was added to the solution, and 2.5 g (5.9 mmol) of Compound (6-c) was separated from the solution by filtration.

1 g (2.4 mmol) of Compound (6-c) was dissolved in 10 ml of tetrahydrofuran and 570 μl (7.1 mmol) of pyridine was added to the solution. After the solution was cooled with ices, 492 μl (5.6 mmol) of bromoacetyl bromide was added dropwise to the solution. After being stirred at room temperature for 30 minutes, the solution was poured in ice-hydrochloric acid to yield the crude product. After filtration, the crude product was purified by silica gel chromatography to yield 830 mg (1.2 mmol) of Compound (6-d).

750 mg (1.12 mmol) of Compound (6-d) was dissolved in 5 ml of acetone, 170 μl (2.5 mmol) of acrylic acid and 341 mg (2.5 mmol) of potassium carbonate was added to the solution and the solution was refluxed for 2 hours. After cooling, water was poured in the solution to yield the crude product. After filtration, the crude product was purified by silica gel chromatography to yield 630 mg (1.0 mmol) of Compound (I-6).

The Compound (I-6) obtained exhibited liquid crystallinity and phase transition as follows:

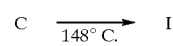

The NMR data of the compound obtained was as follows:

NMR (CDCl3): δ=7.29 (s, 2H), 7.14 (d, 2H), 7.10 (d, 2H), 6.55 (d, 2H), 6.25 (dd, 2H), 5.99 (d, 2H), 4.92 (s, 4H), 2.67 (m, 2H), 2.34 (m, 4H), 1.72 (m, 4H).

Example 3

Synthesis of Example Compound (I-7)

The Compound (6-c) was reacted with acryloyl chloride to yield Compound (I-7).

The Compound (I-7) exhibited liquid christallinity and phase transition as follows.

It is to be noted that "S" is sumectic phase hereinafter.

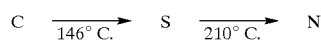

The NMR data of the compound obtained was as follows:

NMR (CDCl3): δ=7.24 (s, 2H), 7.13 (d, 2H), 7.10 (d, 2H), 6.61 (d, 2H), 6.31 (dd, 2H), 6.03 (d, 2H), 2.72 (m, 2H), 2.34 (m, 4H), 1.71 (m, 4H).

Example 4

Synthesis of Example Compound (I-9)

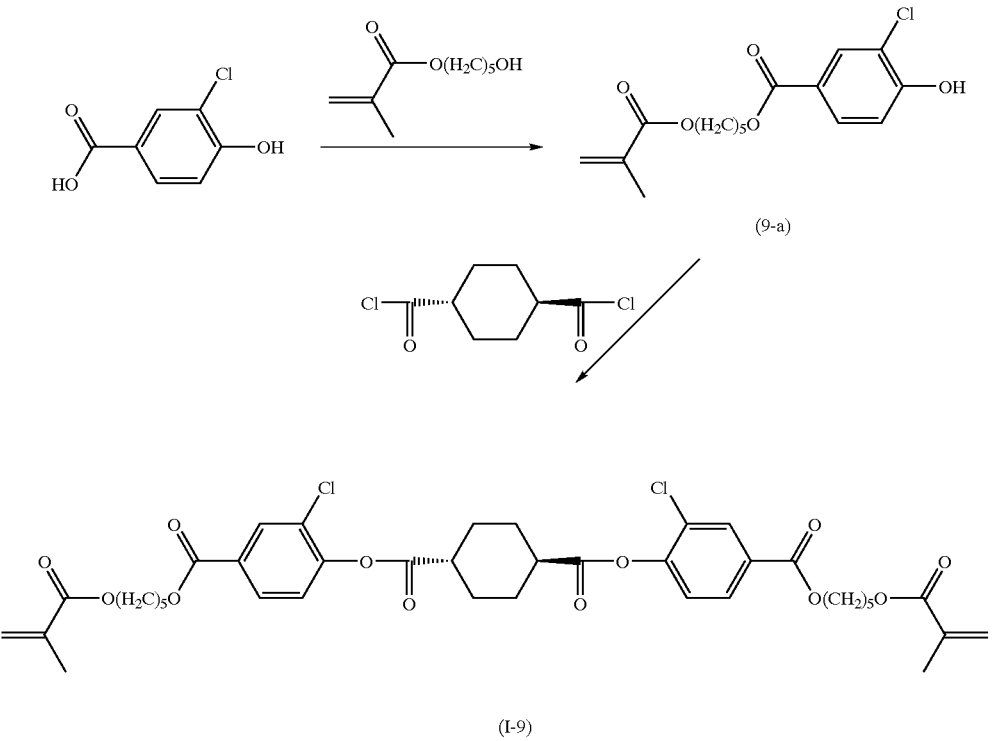

(I-9)

1 g (5.8 mmol) of 3-chloro-4-hydroxy-benzoic acid was dissolved in 10 ml of tetrahydrofuran and 1 g (5.8 mmol) of 5-hydroxypentyl-metacrylic acid and 1.31 g (6.4 mmol) of dicyclohexylcarbodiimide were added to the solution. The mixture was stirred at room temperature for an hour to yield crystals. After removing the crystals by filtration, the filtrate was concentrated and purified by silica gel chromatography to yield 360 mg (1.1 mmol) of Compound (9-a).

250 mg (0.77 mmol) of Compound (9-a) was dissolved in 5 ml of tetrahydrofuran and 93 μl (1.15 mmol) of pyridine was added to the solution. The toluene solution of 0.39 mmol of trans-1,4-cyclohexane-di-chlorocarbonyl, which was synthesized by the method same as Example 1, was added dropwise to the chloroform solution, the mixture was stirred at room temperature for an hour, washed with hydrochloric acid solution, dehydrated with magnesium sulfate anhydride and concentrated in vacuo. The crude product was purified by silica gel chromatography to yield 210 mg (0.26 mmol) of Compound (I-9).

The Compound (I-9) exhibited liquid christallinity and phase transition as follows:

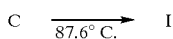

The NMR data of the compound obtained was as follows:
NMR (CDCl3): δ=8.16 (s, 2H), 7.98 (d, 2H), 7.21 (d, 2H), 6.10 (S, 2H), 5.55 (S, 2H), 4.36 (t, 4H), 4.19 (t, 4H), 2.73 (m, 2H), 2.38 (m, 4H), 1.93 (s, 6H), 1.90–1.65 (m, 12H), 1.60–1.40 (m, 4H).

Example 5

Synthesis of Example Compound (I-8)

Compound (I-8) was synthesized by the method same as in the synthesis of Compound (I-9).

The Compound (I-8) exhibited liquid christallinity and phase transition as follows:

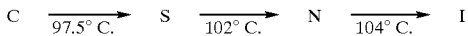

The NMR data of the compound obtained was as follows:

NMR (CDCl3): δ=8.14 (s, 2H), 7.96 (d, 2H), 7.20 (d, 2H), 6.44 (d, 2H), 6.15 (dd, 2H), 5.84 (d, 2H), 4.35 (t, 4H), 4.18 (t, 4H), 2.70 (m, 2H), 2.36 (m, 4H) 2.00–1.65 (m, 12H).

Example 6

Synthesis of Example Compound (I-17)

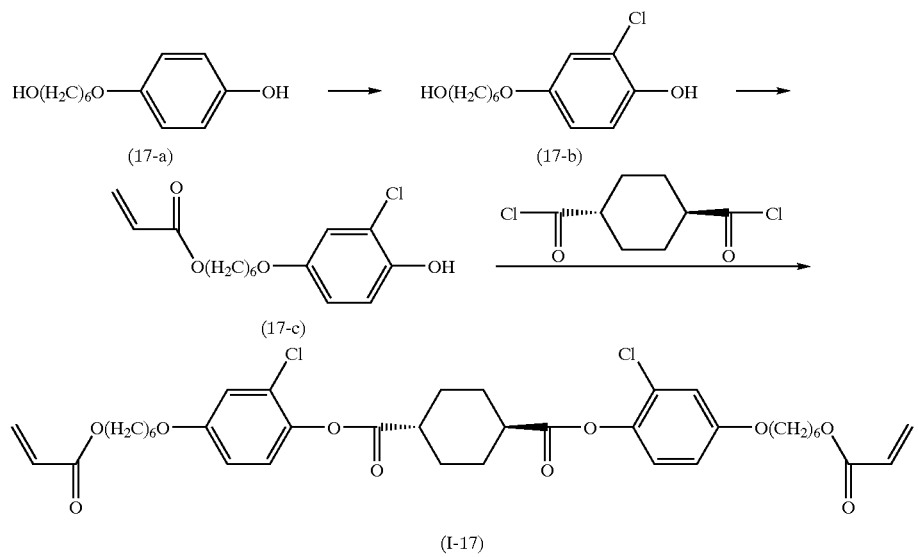

20 g (110 mmol) of 6-bromo-1-hexanol, 36.48 g (331 mmol) of hydroquinone and 45.75 g (331 mmol) of potassium carbonate were dissolved in 200 ml of dimethylformamide under nitrogen gas atmosphere and the solution was stirred at 80° C. for 3 hours. The reaction solution was poured in ice-hydrochloric acid and the mixture was extracted with ethyl acetate. The organic solvent extract was washed with water, dehydrated with magnesium sulfate and purified by silica gel chromatography to yield 13 g (61.8 mmol) of Compound (17-a).

9.25 g (44 mmol) of Compound (17-a) was dissolved in 100 ml of chloroform, 3.53 g (44 mmol) of sulfuric chloride was added to the solution and the mixture was stirred for an hour. The mixture was concentrated in vacuo and purified by silica gel chromatography to yield 9.7 g (39.6 mmol) of Compound (17-b). The obtained 9.7 g (39.6 mmol) of Compound (17-b) was dissolved in 50 ml of tetrahydrofuran and 6.02 ml (47.52 mmol) of dimethyl aniline was added to the solution under ice cooling. After added 3.38 ml (41.6 mmol) of acryloyl chloride, the mixture was stirred for 2 hours, poured in ice-hydrochloric acid and extracted with ethyl acetate. The organic solvent extract was washed with water, dehydrated with magnesium sulfate anhydrate, concentrated in vacuo and purified by silica gel chromatography to yield 10.1 g (33.81 mmol) of Compound (17-c).

9 g (12.3 mmol) of Compound (I-17) was synthesized with the Compound (17-c) by the method same as in the synthesis of Compound (I-5).

The obtained compound had the melting point of 73° C. and exhibited liquid crystallinity and phase transition as follows.

The NMR data of the compound obtained was as follows:

NMR (CDCl3): δ=7.05–6.85 (br, 4H), 6.80 (d, 2H), 6.40 (d, 2H), 6.14 (dd, 2H), 5.81 (d, 2H), 4.15 (t, 4H), 3.90 (t, 4H), 2.68 (m, 2H), 2.31 (m, 4H), 2.00–1.30 (m, 20H).

Example 7

Synthesis of Example Compound (I-18)

Compound (I-18) was synthesized by the method same as in the synthesis of Compound (I-17).

The obtained compound had the melting point of 73° C. and exhibited liquid crystallinity and phase transition as follows.

The NMR data of the compound obtained was as follows:

NMR (CDCl3): δ=7.02–6.96 (br, 4H), 6.80 (d, 2H), 6.39 (d, 2H), 6.12 (dd, 2H), 5.82 (d, 2H), 4.16 (t, 4H), 3.92 (t, 4H), 2.65 (m, 2H), 2.33 (m, 4H), 2.00–1.30 (m, 28H).

Another example compounds may be synthesized by the way like as the above mentioned method.

Example 8

Retardation films which were produced in the way hereinafter prescribed with the use of respectively Compound (I-5) of the present invention and Comparative Compound A here showed were compared performances each other.

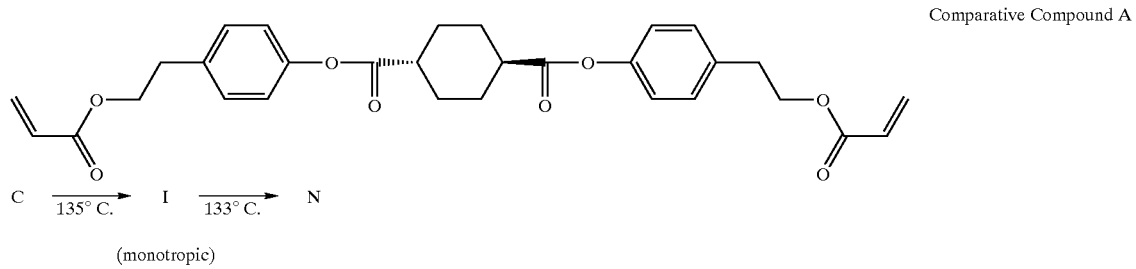

Comparative Compound A (monotropic)

A tri acetyl cellulose film was used as a transparent base. A dilute solution of "SE-150" (manufactured by NISSAN CHEMICAL INDUSTRIES, LTD.) was continuously applied on a surface of the transparent base, thereby to produce an alignment layer having a thickness of 0.5 μm. After the alignment layer was subjected to rubbing treatment, a chloroform solution containing Compound (I-5) in 20 wt. % and a photo polymerization initiator showed hereinafter in 4 wt. % was provided on the alignment layer by spin coat method, heated at 125° C., which is 5° C. higher than the melting point of Compound (I-5), for 30 seconds on a hot-stage. After that, UV irradiation was carried out for polymerization of the Compound (I-5) by a mercury lamp at 80° C., thereby obtaining a flat and smooth retardation film.

On the other hand, the solution containing Comparative Compound A was provided on the alignment layer by spin coat method and heated at 140° C., which is 5° C. higher than the melting point of Comparative Compound A, for 30 seconds on a hot-stage. After that, UV irradiation was carried out for polymerization of the Comparative Compound A by a mercury lamp at 80° C., however, the transparent base distorted under heating at 140° C. and the polymerized layer could not function as a retardation film.

Polymerization Intiator

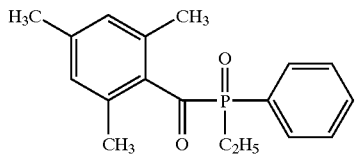

Example 9

Retardation films which were produced in the way hereinafter prescribed with the use of respectively Compound (I-17) of the present invention and Comparative Compound B here showed, disclosed in "J. Appl. Phys., vol. 79(1996), No.10 p. 8098–8105", were compared performances each other.

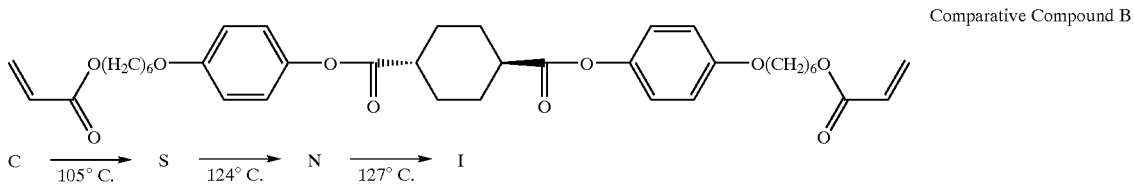

Comparative Compound B

A glass plate was used as a transparent base. A dilute solution of "SE-150" (manufactured by NISSAN CHEMICAL INDUSTRIES, LTD.) was continuously applied on a surface of the transparent base, thereby to produce an alignment layer having a thickness of 0.5 μm. After the alignment layer was subjected to rubbing treatment, a chloroform solution containing Compound (I-17) in 20 wt. %, a photo polymerization initiator, used in Example 8, in 2 wt. % and an additive for an homogeneous alignment, here showed, in 0.1 wt. % was provided on the alignment layer by spin coat method, heated at 81° C., which is a clearing point of Compound (I-17), for 30 seconds on a hot-stage. After lower the temperature 5° C. (namely down to 76° C.), UV irradiation was carried out under nitrogen gas atmosphere for polymerization of the Compound (I-17) by a mercury lamp, thereby obtaining a retardation film exhibiting an uniform retardation (248 nm).

Additive for a homogeneous alignment

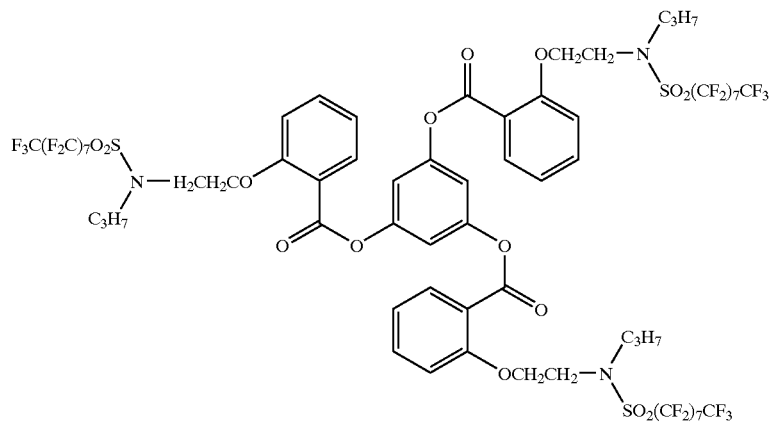

The solution, which was prepared according to the above mentioned method except that the Compound (I-17) was replaced with Comparative Compound B, was provided on the alignment layer by spin coat method. After heating at 121° C., which is a clearing point of the Comparative Compound B, for 30 seconds on a hot-stage and lowering the temperature 5° C. (namely down to 116° C.), UV irradiation was carried out for polymerization of the Comparative Compound B, thereby obtaining a non-uniform polymerized layer having mingled nematic and smectic phases, which could not function as a retardation film.

The effect in a case that Compound (I-5) having a low melting point is used for production of the optical compensating sheet was demonstrated by the result of Example 8.

Example 9 demonstrated that Compound (I-17) transferred to nematic phase at relatively a low temperature other than to smectic phase. As a result, an optical compensating sheet, exhibiting a uniform retardation, could be produced with the use of Compound (I-17) more easier than with the use of Comparative Compound B.

It was thus concluded that the present invention was successful in providing a polymerizable compound having a low melting point and a wide temperature range of liquid crystal phase, which is useful for production of an optical compensator.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A compound represented by Formula (I):

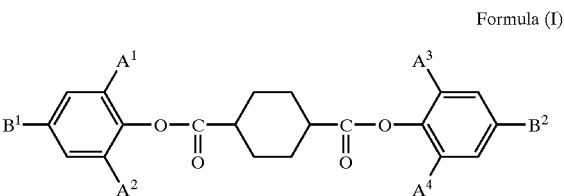

Formula (I)

where $A^1$ to $A^4$ are respectively hydrogen or substituents and at least one of $A^1$ to $A^4$ is halogen, alkyl group, alkoxy group, formyl or cyano; $B^1$ and $B^2$ are respectively substituents and at least one of them is a substituent containing acryloyloxy, methacryloyloxy or epoxy.

2. The compound of claim 1, wherein at least one of $A^1$ to $A^4$ is fluorine, chlorine or methyl.

3. The compound of claim 1, wherein at least one of $A^1$ to $A^4$ is chlorine.

4. The compound of claim 1, wherein both of $A^1$ and $A^3$ are hydrogen and both of $A^2$ and $A^4$ are independently selected from the group consisting of halogen, alkyl, alkoxy, formyl and cyano.

5. The compound of claim 1, wherein both of $A^1$ and $A^3$ are hydrogen and both of $A^2$ and $A^4$ are chlorine.

6. The compound of claim 1, wherein both of $B^1$ and $B^2$ are independently acrylate or methacrylate.

7. The compound of claim 1, wherein $B^1$ and $B^2$ are respectively represented by any one of formulae (II) to (VIII);

| | |
|---|---|
| —$CH_2CH_2OCOCX$=$CH_2$, | Formula (II), |
| —$O(CH_2)_nOCOCX$=$CH_2$, | Formula (III), |
| —$COO(CH_2)_nOCOCX$=$CH_2$, | Formula (IV), |
| —$OCO(CH_2)_nOCOCX$=$CH_2$, | Formula (V), |
| —$OCOO(CH_2)_nOCOCX$=$CH_2$, | Formula (VI), |
| —$CH_2CH_2OCO(CH_2)_nOCOCX$=$CH_2$, | Formula (VII), |
| —$CH_2CH_2OCOO(CH_2)_nOCOCX$=$CH_2$ | Formula (VIII) | where in the formulae, X is hydrogen or methyl and n is an integer of 1 to 10.

8. The compound of claim 7, wherein both of $A^1$ and $A^3$ are hydrogen; both of $A^2$ and $A^4$ are independently selected from the group consisting of halogen, alkyl, alkoxy, formyl and cyano; and $B^1$ and $B^2$ are respectively represented by any one of the formulae (II) to (VIII).

9. The compound of claim 1, wherein the two aryloxycarbonyl groups in the formula (I) are situated in trans configuration.

10. The compound of claim 1, which exhibits liquid crystallinity.

11. An optical compensator comprising a layer formed from a compound represented by Formula (I):

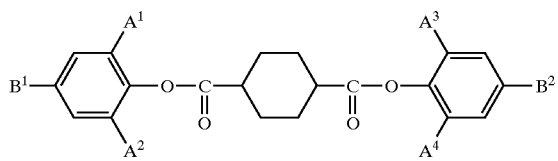

Formula (I)

where $A^1$ to $A^4$ are respectively hydrogen or substituents and at least one of $A^1$ to $A^4$ is halogen, alkyl group, alkoxy group, formyl or cyano; $B^1$ and $B^2$ are respectively substituents and at least one of them is a substituent containing acryloyloxy, methacryloyloxy or epoxy.

12. The optical compensator of claim 11, wherein at least one of $A^1$ to $A^4$ is fluorine, chlorine or methyl.

13. The optical compensator of claim 11, wherein at least one of $A^1$ to $A^4$ is chlorine.

14. The optical compensator of claim 11, wherein both of $A^1$ and $A^3$ are hydrogen and both of $A^2$ and $A^4$ are independently selected from the group consisting of halogen, alkyl, alkoxy, formyl and cyano.

15. The optical compensator of claim 11, wherein both of $A^1$ and $A^3$ are hydrogen and both of $A^2$ and $A^4$ are chlorine.

16. The optical compensator of claim 11, wherein both of $B^1$ and $B^2$ are independently acrylate or methacrylate.

17. The optical compensator of claim 11, wherein $B^1$ and $B^2$ are respectively represented by any one of formulae (II) to (VIII);

| | |
|---|---|
| —$CH_2CH_2OCOCX$=$CH_2$, | Formula (II), |
| —O$(CH_2)_n$OCOCX=$CH_2$, | Formula (III), |
| —COO$(CH_2)_n$OCOCX=$CH_2$, | Formula (IV), |
| —OCO$(CH_2)_n$OCOCX=$CH_2$, | Formula (V), |
| —OCOO$(CH_2)_n$OCOCX=$CH_2$, | Formula (VI), |
| —$CH_2CH_2$OCO$(CH_2)_n$OCOCX=$CH_2$, | Formula (VII), |
| —$CH_2CH_2$OCOO$(CH_2)_n$OCOCX=$CH_2$ | Formula (VIII) | where in the formulae, X is hydrogen or methyl and n is an integer of 1 to 10.

18. The optical compensator of claim 17, wherein both of $A^1$ and $A^3$ are hydrogen; both of $A^2$ and $A^4$ are independently selected from the group consisting of halogen, alkyl, alkoxy, formyl and cyano; and $B^1$ and $B^2$ are respectively represented by any one of the formulae (II) to (VIII).

19. The optical compensator of claim 11, wherein the two aryloxycarbonyl groups in the formula (I) are situated in trans configuration.

20. The optical compensator of claim 11, wherein the compound represented by the formula (I) exhibits liquid crystallinity.

21. The optical compensator of claim 11, wherein the layer is prepared by polymerization of the compound represented by the formula (I) oriented in nematic phase.

22. The optical compensator of claim 11, further comprising a transparent substrate and a layer formed from a compound represented by the formula (I) as an optically anisotropic layer.

23. The optical compensator of claim 11, wherein a content of the compound represented by the formula (I) in the layer is 50% or more by weight.

* * * * *